Patented Sept. 12, 1950

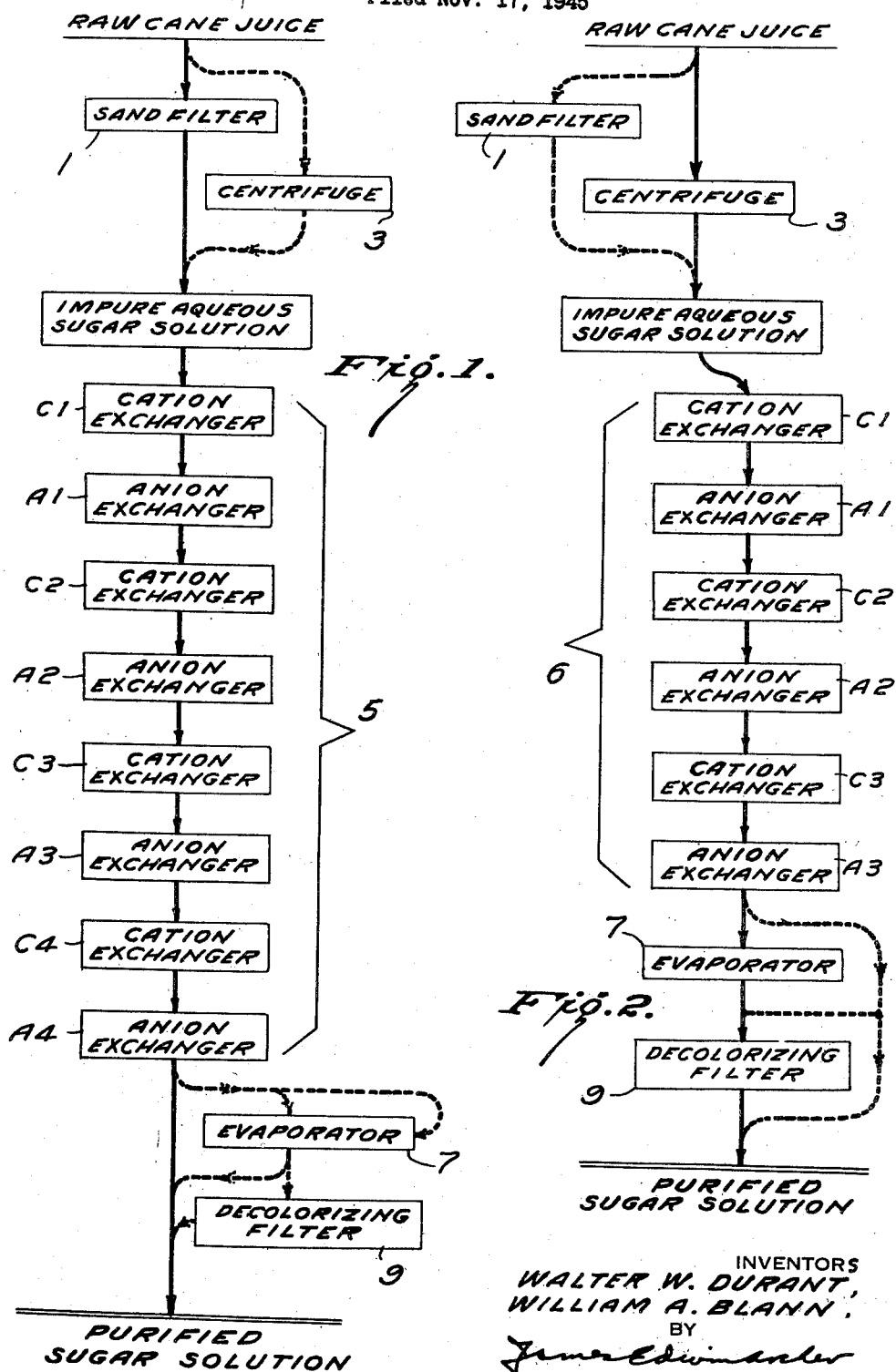

2,522,022

UNITED STATES PATENT OFFICE 2,522,022

SUGAR PURIFICATION PROCESS

Walter W. Durant, Old Greenwich, and William A. Blann, Stamford, Conn., assignors to American Cyanamid Company, New York, N. Y., a corporation of Maine Application November 17, 1945, Serial No. 629,310

9 Claims. (Cl. 127—46)

This invention relates to improved processes of purifying aqueous solutions containing sugar.

Previously the use of ion exchange resins to purify sugar solutions or sugar juices has been proposed, but the use of ion exchangers in the purification of sugar juices has not been entirely successful and accordingly, most attempts to purify sugar juices by means of ion exchangers have been abandoned. The failure to use ion exchangers in sugar purification is attributed to a number of factors. One of these is the very high concentration of impurities to be removed from raw sugar juices, and coupled with this the wide variety of ions to be removed, particularly the wide variety of acidic impurities. Because of the different strengths of the many different acids contained in sugar juices, previous processes were capable of removing a substantial proportion of the acids only when the anion exchangers were run to the point where they were only partially exhausted, inasmuch as strong acids replace weaker acids which have been absorbed by the anion exchanger. When the system is operated in this fashion, the amount of sugar juice which can be purified during a single run is so small that the cost of purification is very high and the loss of sugar syrup in sweet water and in wash water for the resins is also high, and therefore, the process is not sufficiently economical for commercial utilization.

The use of a series of ion exchangers comprising a plurality of beds of ion exchangers has been proposed, but we have found that in order to use such a system it is necessary to control that system with considerable care and in accordance with the principles of this invention.

An object of the present invention is to provide an improved process for the purification of sugar, and more particularly for the purification of raw sugar juices.

Another object of the present invention is to provide a satisfactory and economical method for the purification of sugar juices by means of ion exchange materials.

Still another object of the present invention is to provide an improved method for the operation of a sugar purification system involving the use of ion exchange materials.

These and other objects are obtained by passing an impure aqueous sugar solution through a system including a series of ion exchangers comprising a plurality of pairs of ion exchangers, one of which is a hydrogen zeolite and the other of which is an anion exchanger, continuing to pass the solution through the system while the pH of the influent to the final anion exchanger is higher than 2.9. Preferably the passage of the solution through the aforementioned system is continued only so long as the pH of the effluent from the final anion exchanger is at least 4. If high quality sugar is to be crystallized from the purified sugar solution, it is desirable that the influent to the final anion exchanger contain less than 600 P. P. M. of acid as determined by titration, and assuming that the acid has an equivalent weight of 50 and also while said influent contains less than 50 P. P. M. of cations, assuming that the cations have an equivalent weight of 50.

The drawing is a flow sheet showing two embodiments of our invention.

In Figure 1, the raw cane juice passes through a sand filter 1 or a centrifuge 3 and thence through a system 5 comprising a cation exchanger C1, an anion exchanger A1, a cation exchanger C2, an anion exchanger A2, a cation exchanger C3, an anion exchanger A3, a cation exchanger C4 and an anion exchanger A4. The resulting purified sugar solution may optionally pass through either an evaporator 7 or a decolorizing filter 9 or both.

In Figure 2, the raw cane juice passes through a centrifuge 3 or a sand filter 1 and thence through a system 6 comprising a cation exchanger C1, an anion exchanger A1, a cation exchanger C2, an anion exchanger A2, a cation exchanger C3 and an anion exchanger A3. The purified juice flowing from anion exchanger A3 passes through an evaporator 7 and a decolorizing filter 9 or optionally, either the evaporator or decolorizing filter or both are by-passed.

The purified sugar solution obtained in accordance with our process may be concentrated and sugar crystallized therefrom in accordance with the usual practice in the sugar industry, or it may be used with or without concentration as a high-quality sugar syrup in the manufacture of sweetened products or as a table syrup, either alone or diluted with other syrups to obtain the desired flavor.

As pointed out heretofore, the pH of the influent to the anion exchanger A3 (or A4) should not fall below 2.9, and the pH of the effluent from bed A3 (or A4) should be at least 4, and for many purposes it is desirable that the pH of this effluent be kept well above this value. If a high-quality sugar is to be produced from the sugar solutions purified in accordance with this invention, it is also desirable that the influent to bed A3 (or A4) contain no more than 600 P. P. M. of acid as determined by titration, assuming that the acid has an equivalent weight of 50 and also while said influent contains less than 50 P. P. M. of cations, assuming that the cations have an equivalent weight of 50.

The effluent from bed A3 (or A4) is an extremely light-colored and highly-purified sugar solution, but in order to remove any traces of coloring matter and/or other impurities, especially non-ionizable impurities, it is sometimes desirable to pass this effluent through a char filter containing either decolorizing charcoal, activated charcoal or bone char. This decolorizing filter is optional and is not necessary in many cases.

The following examples in which the proportions are by weight, except where otherwise indicated, are given by way of illustration and not in limitation. The analyses and other data given herein are all based upon the assumption that the cations and anions have an equivalent weight of 50.

EXAMPLE 1

A system of the type shown in Figure 1 of the drawing is employed in this example, and each bed of exchangers contains about two cubic feet of active material. A resinous hydrogen zeolite of the type described in Example 5 of Patent No. 2,372,233 is used in the cation exchangers, while a product prepared in accordance with the Swain Patent No. 2,285,750 (e. g. in accordance with Example 1 of that patent) is used in the anion exchangers. The cation exchangers are activated or regenerated with about 2.5 pounds of sulfuric acid per cubic foot of resin, while the anion exchangers are activated with about 3 pounds of sodium hydroxide per cubic foot of resin. The activation or regeneration is carried out by diluting the regenerating material with water to form a solution containing about 2% acid or 2% alkali.

A raw cane juice is centrifuged or filtered to remove suspended material including bits of cane, dirt, etc. The raw juice has the following analysis:

| | |
|---|---|
| Total solids (Brix) | 14.6 |
| Sucrose (per cent of solids) | 78.3 |
| Reducing sugars (per cent of solids) | 6.86 |
| Total non-sugars (per cent of solids) | 14.84 |
| Free acidity (per cent of juice) | 0.1 |
| Total anions (per cent of juice) | 0.7005 |
| pH | 5.4–5.5 |

Cations: Per cent of juice
| | |
|---|---|
| Na | 0.0019 |
| K | 0.4370 |
| Ca and Mg | 0.1616 |

At the start of our process, the ion exchangers are back-washed and regenerated if necessary, and thereafter rinsed with water. The beds are not drained when the raw sugar juice is fed into bed C1. The first 60 gallons of effluent contains very little sugar, and is mainly the water contained in the system originally, and accordingly, it may be discarded. The next 50 gallons of effluent should be collected, and this has the following analysis:

| | |
|---|---|
| Total solids (Brix) | 8.5 |
| pH | 4.5 |
| Acidity (P. P. M.) | 30 |
| Na (P. P. M.) | 7 |
| K (P. P. M.) | 3 |
| Ca and Mg (P. P. M.) | 14 |

It is to be noted that the calcium and magnesium found in the treated juice is accounted for by the hardness in the water which adheres to the exchangers and which mixes with the juice. When the pH of the influent to bed A3 is 2.9, the system is ordinarily shut down and the syrup remaining in the beds is recovered by any one of several methods. In order to avoid dilution, it is preferable that the solution remaining in the ion exchangers be blown out of the system by air or other inert gas. However, if desired, the sugar solution may be forced through the system by means of water, but in this case some dilution will occur. After all of the sugar solution has been blown out with air, the remaining solution adhering to the particles of ion exchangers may be removed by passing water through the system and the resulting sweet water may be collected separately for processing or for blending with the raw sugar juice in subsequent purification operations. Optionally, this sweet water may be purified separately by our process.

The following tables serve to illustrate the method of control which we employ and the effect of the use of a system such as that shown in the drawing. Attention is called to the fact that the analyses and other data are given in each case for samples taken at the time that the indicated amount of effluent has been drawn from the last of the six exchangers.

TABLE I

Data from bed C1

| Gallons sugar juice effluent from system | 60 | 90 | 110 | 130 |
|---|---|---|---|---|
| Total solids (Brix) | 13.6 | 14.5 | 14.4 | 14.5 |
| pH | 2.4 | 4.8 | 4.9 | 5.3 |
| Acidity (P. P. M.) | 5,400 | 1,900 | 1,550 | 1,050 |
| Na (P. P. M.) | 10 | 31 | 24 | 22 |
| K (P. P. M.) | 150 | 4,070 | 4,250 | 4,200 |
| Ca and Mg (P. P. M.) | 146 | 662 | 753 | 852 |

TABLE II

Data from bed A1

| Gallons sugar juice effluent from system | 60 | 90 | 110 | 130 |
|---|---|---|---|---|
| Total solids (Brix) | 12.8 | 14.5 | 14.5 | 14.5 |
| pH | 3.7 | 4.5 | 5 | 5.2 |
| Acidity (P. P. M.) | 1,950 | 2,500 | 1,250 | 1,200 |
| Na (P. P. M.) | 11 | 35 | 31 | 25 |
| K (P. P. M.) | 130 | 3,000 | 3,450 | 3,600 |
| Ca and Mg (P. P. M.) | 154 | 119 | 686 | 737 |

TABLE III

Data from bed C2

| Gallons sugar juice effluent from system | 60 | 90 | 110 | 130 |
|---|---|---|---|---|
| Total solids (Brix) | 12.1 | 13.1 | 13.6 | 13.8 |
| pH | 3.5 | 2.7 | 2.7 | 3.1 |
| Acidity (P. P. M.) | 1,600 | 5,100 | 5,100 | 5,100 |
| Na (P. P. M.) | 11 | 31 | 50 | 160 |
| K (P. P. M.) | 34 | 107 | 140 | 700 |
| Ca and Mg (P. P. M.) | 13 | 134 | 311 | 600 |

TABLE IV

Data from bed A2

| Gallons sugar juice effluent from system | 60 | 90 | 110 | 130 |
|---|---|---|---|---|
| Total solids (Brix) | 11.1 | 12.3 | 12.8 | 12.8 |
| pH | 7.6 | 4.1 | 4.4 | 4.2 |
| Acidity (P. P. M.) | | 470 | 600 | 1,525 |
| Na (P. P. M.) | 31 | 25 | 50 | 140 |
| K (P. P. M.) | 20 | 60 | 125 | 150 |
| Ca and Mg (P. P. M.) | 60 | 385 | 219 | 350 |

TABLE V

Data from bed C3

| Gallons sugar juice effluent from system | 60 | 90 | 110 | 130 |
|---|---|---|---|---|
| Total solids (Brix) | 7.8 | 11.9 | 12.3 | 12.3 |
| pH | 4.3 | 3.7 | 3.7 | 3.7 |
| Acidity (P. P. M.) | 100 | 500 | 550 | 1,050 |
| Na (P. P. M.) | 7 | 10 | 22 | 20 |
| K (P. P. M.) | 3 | 10 | 18 | 15 |
| Ca and Mg (P. P. M.) | 0 | 0 | 0 | 22 |

TABLE VI

Data from bed A3

| | | | | |
|---|---|---|---|---|
| Gallons sugar juice effluent from system | 60 | 90 | 110 | 130 |
| Total solids (Brix) | 1.7 | 10.9 | 11.9 | 12.1 |
| pH | 8.8 | 4.3 | 4.5 | 3.9 |
| Acidity (P. P. M.) | | 50 | 110 | 230 |
| Alkalinity (P. P. M.) | 10 | | | |
| Na (P. P. M.) | 15 | 7 | 10 | 15 |
| K (P. P. M.) | 7 | 3 | 7 | 12 |
| Ca and Mg (P. P. M.) | 12 | | | |

From the above tables, it will be seen that about the first 60 gallons of effluent should be discarded because of the low sugar content therein and that the following 50–60 gallons should be collected for concentration to syrup and if desired, for the crystallization of sugar. About 70 gallons of water are necessary to "sweeten off" and this should be introduced into the system when about 60 gallons of effluent have been drawn from the system. The "sweet water" remaining in the system may be combined with the collected sugar juice and the whole concentrated to give a syrup having the following analysis:

| | |
|---|---|
| Total solids (Brix) | 58.4 |
| Sucrose (per cent of solids) | 90.1 |
| Reducing sugars (per cent of solids) | 8.5 |
| Total non-sugars (per cent of solids) | 1.4 |

From this it can be computed that the removal of the non-sugar impurities in the sugar syrup is about 91%.

This treated juice may be further concentrated, preferably under vacuum, and sugar crystallized therefrom. The resulting molasses may be combined with the first molasses obtained from the first strike of sugar from succeeding batches of purified juice, and a second strike of sugar may be obtained leaving a second molasses which may in turn be combined with other molasses or sugar syrups and further sugar crystallized therefrom. In this way as many as four strikes or more of sugar may be obtained from syrup purified in accordance with our process.

The molasses obtained from the syrups, as sugar is crystallized therefrom, gradually becomes darker, but it is considerably lighter than molasses obtained from syrups which are purified by the ordinary sugar purification methods.

The color of the sugar syrup purified in accordance with our process is very light colored, but it may be further improved if desired by treatment with decolorizing charcoal with bone black or other decolorizing materials.

EXAMPLE 2

A raw sugar cane juice having the analysis shown in Table VIII is passed through a series of ion exchangers comprising a cation exchanger, an anion exchanger, a second cation exchanger and a second or final anion exchanger. Each of the beds of ion exchanger contains 3.5 cubic feet of active material and the ion active materials employed are the same as those used in Example 1. The sugar juice is centrifuged and then passed through the system at the rate of about 2 gallons per minute. The raw juice contains about 3550 P. P. M. of potassium. The effluent from the first bed of cation exchanger is about 1.8 and contains about 165 P. P. M. of potassium. The pH of the effluent from the first anion exchanger is originally about 8 and drops gradually to about 4.5. The effluent from the second cation exchanger contains no detectable potassium and the pH ranges from about 4 to no lower than about 3.2. The effluent from the final bed of ion active material has a pH ranging from about 10 down to about 4.7, and the total effluent after complete mixing has a pH of about 7.5. About 106 gallons of raw cane juice are passed through the system and then this is displaced with water flowing at the same rate as the juice. The sweet water resulting from the use of the water to remove the sugar juice on the beds is blended with the effluent juice and the whole is concentrated to produce a syrup as shown in Table VII.

EXAMPLE 3

A raw sugar cane juice having the analysis shown in Table VIII is treated in the same manner as described in Example 2. The raw juice has about 3130 P. P. M. of potassium. The effluent from the first bed of cation exchanger has a pH of about 1.8 and contains 150 P. P. M. of potassium, while the effluent from the first bed of anion active material has a pH ranging from about 10 to 5.3. The effluent from the second bed of cation exchanger has a pH ranging from about 3.8 to no lower than 3.1 and its contains no detectable potassium while the effluent from the final bed of anion active material has a pH ranging from 10.3 to 5, and the pH of the total effluent after mixing is about 8. About 130 gallons of juice are passed through the system after which the juice remaining therein is displaced with water. The resulting sweet water is mixed with the treated juice and the whole is concentrated to a syrup having the composition given in Table VIII.

EXAMPLE 4

A raw sugar cane juice having the analysis shown in Table IX is treated in the same manner as described in Example 2. The original juice contains about 3070 P. P. M. of potassium while the effluent from the first bed of cation active material contains only about 130 P. P. M. of potassium, and it has a pH of about 1.7. The effluent from the first bed of anion active material has a pH ranging from about 8 down to 6 while the pH of the effluent from the second bed of cation active material ranges from about 4.4 to 3.2, and while the pH of the effluent from the final bed of anion active material ranges from about 10 to 9. After about 150 gallons of juice are passed through the system, the pH of the effluent from the first bed of cation active material rises gradually to about 3.5 and the potassium content increases to about 1000 P. P. M. The pH from the first bed of anion active material drops slightly but the pH of the effluent from the second bed of cation active material drops to about 2 and it contains somewhat less than 20 P. P. M. of potassium. Furthermore, the pH of the effluent from the final bed of anion active material drops rapidly to about 3.6. From this it is apparent that no more than about 150 gallons of juice should be passed through the system, and thereafter the sugar syrup remaining in the system should be removed, such as by displacement with water. Thereafter the sweet water is blended with the treated juice and the whole concentrated. Table IX shows the analysis of a concentrated syrup obtained by exceeding the limits set forth in accordance with this invention, and by passing about 192 gallons of juice through the system. It will be observed that the removal of organic non-sugars is considerably less than in Examples 2 and 3. On the other hand, the removal of inorganic ash content is quite good, and therefore, a process such as this might be useful in some instances where the reduction in inorganic non-sugar solids is not of primary importance.

TABLE VII

|  | Raw Juice | Purified Syrup |  |
|---|---|---|---|
| Total Solids (Brix) | 14.6 | 58.4 |  |
| Sucrose (Per Cent of Solids) | 78.3 | 90.1 |  |
| Reducing Sugars (Per Cent of Solids) | 6.86 | 8.5 |  |
| Total Non-Sugars (Per Cent of Solids) | 14.84 | 1.4 |  |
| pH | 5.5 |  |  |
| Per Cent Removal |  |  | 91.0 |
| Sodium (Per Cent of Solids) | .01 | .053 |  |
| Potassium (Per Cent of Solids) | 2.32 | .0027 |  |
| Calcium and Magnesium (Per Cent of Solids) | .72 | .00 |  |
| Per Cent Removal |  |  | 98.0 |

TABLE VIII

|  | Raw Juice | Purified Syrup |  |
|---|---|---|---|
| Total Solids (Brix) | 13.4 | 67.86 |  |
| Sucrose (Per Cent of Solids) | 76.2 | 85.8 |  |
| Reducing Sugars (Per Cent of Solids) | 7.27 | 9.4 |  |
| Total Non-Sugars (Per Cent of Solids) | 16.5 | 1.87 |  |
| pH | 5.5 |  |  |
| Per Cent Removal |  |  | 88.9 |
| Sodium (Per Cent of Solids) | .019 | .040 |  |
| Potassium (Per Cent of Solids) | 2.22 | .011 |  |
| Calcium and Magnesium (Per Cent of Solids) | .881 | .018 |  |
| Per Cent Removal |  |  | 97.8 |

TABLE IX

|  | Raw Juice | Purified Syrup |  |
|---|---|---|---|
| Total Solids (Brix) | 13.26 | 61.7 |  |
| Sucrose (Per Cent of Solids) | 77.07 | 87.5 |  |
| Reducing Sugars (Per Cent of Solids) | 6.95 | 7.85 |  |
| Total Non-Sugars (Per Cent of Solids) | 15.98 | 4.65 |  |
| pH | 5.6 |  |  |
| Per Cent Removal |  |  | 71 |
| Sodium (Per Cent of Solids) | .015 | .015 |  |
| Potassium (Per Cent of Solids) | 2.87 | .010 |  |
| Calcium and Magnesium (Per Cent of Solids) | .71 | .014 |  |
| Per Cent Removal |  |  | 98.9 |

At the start of our process, the beds are preferably "sweetened on" by the following procedure: the ion exchangers are activated or back-washed and regenerated if necessary, then rinsed and finally drained. Thus with a system as in Figure 2, the juice is fed to the cation exchanger C1 while it is open to the atmosphere and until the bed is full of juice at which point the vessel containing the cation exchanger is closed and the effluent is then drawn therefrom while continuing to feed juice thereto, and this effluent is employed to fill bed A1 while it is open to the atmosphere. When bed A1 is full, the vessel containing the ion exchanger is closed and the effluent is then fed to bed C2. Each of the beds of ion exchangers are filled in this manner until the system is entirely full, at which time the effluent from bed A3 is collected. This effluent from bed A3 is collected while it has a pH greater than 4 and while the pH of the influent to bed A3 is above 2.9. A similar procedure is used when systems of the type shown in Figure 1 are used.

While our process is particularly applicable to the purification of raw sugar juices, it may also be used to purify partially-refined sugar solutions. The present process is especially adapted to the purification of sugar solutions obtained from sorghum or from sugar cane or if desired, it may be used in the purification of juices obtained from sugar beets. Other types of sugars which may be purified by our process are: maple sugar, invert sugar, malt sugar, dextrose, fructose, glucose, etc., as well as natural and synthetic mono-, di-, tri-, tetra-, and other poly- saccharides.

In order to minimize inversion of the sugar solutions in the manufacture of sucrose, it is desirable that the temperature of the juice during treatment be kept at about ordinary room temperatures, but if some or a considerable amount of inversion is permissible, higher temperatures may be employed.

The treatment of sugar syrups with ion active materials in accordance with this invention is often sufficient to purify the sugar without the use of any other purification processes or purification agents. However, as heretofore pointed out, it is quite often desirable that a decolorizing agent be employed to remove residual color in the sugar solution after passage through the ion exchange materials. Similarly, in some cases it is desirable that the sugar solution be treated with a decolorizing material in between any two of the beds of ion active materials, but it has been found that it is not as effective when the fluid passing therethrough has a high ion content. Among the substances which may be employed are bone black, diatomaceous earth, bauxite, decolorizing charcoal, oxidizing agents, etc.

The presence of salts, acids and organic non-sugar solids in sugar solutions tends to stabilize the colloidal coloring materials therein. Accordingly, the removal of a high proportion of the salts and organic non-sugar solids by means of our process renders the colloidal coloring materials less stable and they are, therefore, more easily removed by passage through bone char filters. When decolorizing charcoal is used, it is preferably employed after the treatment of the ion exchange substances and after concentration to a syrup, but it may be used at any point in the system, and when not used at the end of the purification system, it is preferably used after passage through a cation active material when the fluid passing through the decolorizing material is acidic. Decolorizing materials may also be mixed with the juice before or during evaporation of water therefrom and then the materials may be removed by filtering the concentrated syrup.

Our system of purification may be operated on the basis described in the foregoing examples after which each of the resin beds is back-washed, regenerated and rinsed. Another way in which our process may be operated in some cases is by the use of a plurality of series of ion exchangers, each of which comprises a hydrogen zeolite and an anion active resin. The last-mentioned pair of ion exchangers are regenerated while the other pairs of ion exchangers are being used in accordance with the procedure described in the foregoing examples. When the cation exchanger of the first pair of ion exchangers is substantially exhausted to cations and the anion exchanger of this pair is exhausted to strong acids (i. e., acids being as strong or stronger than acetic acid), they are removed from the system and the freshly-activated pair of ion exchangers is added to the end of the system. The pair of ion exchangers removed from the system are now re-activated, and in some instances they may also be added to the end of the system when the first of ion exchangers (originally the second pair of ion exchangers) become exhausted. The use of this type of system is somewhat dependent upon the particular type of product to be prepared and also upon the capacity of the ion exchangers. With ion exchangers of very low capacity, this type of process will probably not be economical whereas with high capacity ion exchangers, it will probably be more economical than operating in accordance with the examples. Still another factor in determining the relative economics of the two processes is the cost of regenerant, since as the cost thereof decreases the process employed in the examples becomes more economical.

In place of part or all of the anion active resin used in the example other anion active materials may be substituted. Among these are the aldehyde condensation products of m-phenylene diamine, biguanide, guanyl urea, substituted guanidines such as methyl guanidine, substituted biguanides, such as phenyl biguanide, polyamines preferably the polyethylene polyamines, etc. Such condensation products are preferably formaldehyde condensation products although other aldehyde condensation products may be used if desired. Examples of other aldehydes are furfural, acrolein, benzaldehyde, etc. The active resins, such as those prepared from guanidine, guanyl urea, biguanide and other materials which do not form sufficiently insoluble condensation products with formaldehyde for most practical purposes, are preferably insolubilized with suitable formaldehyde reactive materials, e. g., urea, thiourea, the aminotriazines (especially melamine and the guanamines which react with formaldehyde to produce insoluble products), etc. The anion active resins prepared from guanidine, guanyl urea, biguanide, etc. may be prepared in the same general manner as described in U. S. Patents Nos. 2,251,234 and 2,285,750. Usually it is convenient to use the salts of the bases but the free bases may also be used. Examples of suitable salts for use in the preparation of anion active resins are guanidine carbonate, guanidine sulfate, biguanide sulfate, biguanide nitrate, guanyl urea sulfate, guanyl urea carbonate, etc. U. S. Patents Nos. 2,251,234 and 2,285,750 describe methods of preparing many anion active resins of the aforementioned types.

The anion active resins are activated in the conventional manner by treatment with a dilute solution of an alkali, e. g., a 0.1–10% solution of sodium hydroxide, sodium carbonate, the corresponding potassium salts, etc.

Examples of suitable cation active materials which may be operated on the hydrogen cycle are: aldehyde condensation products of alpha-furyl substituted organic sulfonates such as those disclosed in U. S. Patent No. 2,373,152, polyhydric phenolaldehyde condensation products such as the catecholtannin-formaldehyde condensation products, aromatic sulfonic acid-formaldehyde condensation products (as described in U. S. Patent No. 2,204,539), the carbonaceous zeolites, i. e., the sulfated or sulfonated carbonaceous materials such as coal, peat, lignite, etc. Any of these materials may be operated on the hydrogen cycle and they are therefore suitable for use in accordance with our invention. Broadly speaking, these substances may be termed "hydrogen zeolites." The activation of the cation active materials with an acid and the exchange or reaction of the hydrogen ion of said acid during the purification process is known as "the hydrogen cycle."

Cation active materials may be regenerated or activated by passing dilute acid solutions, e. g., 0.1–10% of hydrochloric acid, sulfuric acid, etc., through the bed and subsequently washing with water until substantially free of the acid used. The cation active resins are then said to be "hydrogen activated." If the solution flowing into cation active bed C1, be one containing a high concentration of calcium, it may be desirable to activate the bed with a salt solution such as an aqueous solution of sodium chloride before activation with the acid.

The term "ionizable solids" or "ionizable materials" is intended to include inorganic materials both volatile and non-volatile. The major proportion of these solids are inorganic but some organic substances may be included. These "ionizable solids" are impurities in the sense that they are not desired in admixture with the fluid to be purified, although they may of themselves be valuable or desirable materials.

Obviously many modifications and variations in our processes and compositions may be made without departing from the spirit and scope of the appended claims.

We claim:

1. A process which comprises passing a raw sugar juice prior to any chemical treatment through a system including a series of ion exchangers comprising a plurality of pairs of ion exchangers, the first one of which is a hydrogen zeolite and the other of which is a resinous anion exchanger, continuing to pass said juice through the system only while the pH of the influent to the final anion exchanger is higher than 2.9.

2. A process which comprises passing a raw sugar juice prior to any chemical treatment through a system including a series of ion exchangers comprising a plurality of pairs of ion exchangers, the first one of each pair being a hydrogen zeolite and the other of each pair being a resinous anion exchanger, continuing to pass said juice through the system only while the pH of the influent to the final anion exchanger is higher than 2.9, and while said influent contains less than about 600 P. P. M. of acid as determined by titration and assuming that the acid has an equivalent weight of 50, and also while said influent contains less than 50 P. P. M. of cations assuming that the cations have an equivalent weight of 50.

3. A process which comprises passing a raw sugar juice prior to any chemical treatment through a system including a series of ion exchangers comprising a plurality of pairs of ion exchangers, the first one of each pair being a hydrogen zeolite and the other of each pair being a resinous anion exchanger, continuing to pass said juice through the system only while the pH of the influent to the final anion exchanger is higher than 2.9 and while the effluent from said final anion exchanger has a pH of at least 4.

4. A process which comprises passing a raw sugar juice prior to any chemical treatment through a system including a series of ion exchangers comprising at least three pairs of ion exchangers, the first one of each pair being a hydrogen zeolite and the other of each pair being a resinous anion exchanger, continuing to pass said juice through the system only while the pH of the influent to the final anion exchanger is higher than 2.9.

5. A process which comprises passing a raw sugar juice prior to any chemical treatment through a system including a series of ion exchangers comprising at least three pairs of ion exchangers, the first one of each pair being a hydrogen zeolite and the other of each pair being a resinous anion exchanger, continuing to pass said juice through the system only while the pH of the influent to the final anion exchanger is higher than 2.9, thereupon removing from the system the first pair of ion exchangers and adding to the end of the system a new pair of ion exchangers, the first one of which is a hydrogen zeolite and the other of which is an anion exchanger, and continuing to pass said juice through the system while the pH of the influent to the anion exchanger of said new pair of ion exchangers is higher than 2.9.

6. In a process as in claim 5, the step which comprises regenerating the first pair of ion exchangers after they are removed from said system.

7. In a process as in claim 5, the steps which comprise regenerating the first pair of ion exchangers after they are removed from said system, and introducing them at the end of the system after the influent to the anion exchanger of said new pair of ion exchangers has fallen to about 3.

8. A process which comprises passing a raw sugar juice through a system including a series of ion exchangers comprising a plurality of pairs of ion exchangers, the first one of each pair being a hydrogen zeolite and the other of each pair being a resinous anion exchanger, continuing to pass said juice through the system only while the pH of the influent to the final anion exchanger is higher than 2.9, and while said influent contains less than about 600 P. P. M. of acid as determined by titration, and assuming that the acid has an equivalent weight of 50, and also while said influent contains less than 50 P. P. M. of cations assuming that the cations have an equivalent weight of 50, concentrating said syrup and crystallizing sugar therefrom.

9. A process which comprises passing a raw sugar juice prior to any chemical treatment through a system including a series of ion exchangers, comprising a plurality of pairs of ion exchangers, the first one of each pair being a hydrogen zeolite and the other of each pair being a resinous anion exchanger, continuing to pass said juice through the system while the pH of the influent to the final anion exchanger is higher than 2.9, and then, when the pH of the influent to said final anion exchanger drops to about 3, modifying the system by adding a new pair of ion exchangers at the end of the system, comprising first a hydrogen zeolite and then a resinous anion exchanger, then passing the effluent from the anion exchanger which was formerly the final anion exchanger into said new pair of ion exchangers and continuing to pass the raw sugar juice through the system so modified while the influent to the anion exchanger of said new pair is higher than 2.9.

WALTER W. DURANT.
WILLIAM A. BLANN.

REFERENCES CITED

The following references are of record in the file of this patent:

UNITED STATES PATENTS

| Number | Name | Date |
|---|---|---|
| 2,104,501 | Adams | Jan. 4, 1938 |
| 2,151,883 | Adams | Mar. 28, 1939 |
| 2,155,318 | Liebknecht | Apr. 18, 1939 |
| 2,264,654 | Boyd | Dec. 2, 1941 |
| 2,366,650 | Rawlings | Jan. 2, 1945 |
| 2,372,233 | Thurston | Mar. 27, 1945 |
| 2,388,194 | Vallez | Oct. 30, 1945 |
| 2,388,195 | Vallez | Oct. 30, 1945 |
| 2,388,222 | Behrman | Oct. 30, 1945 |
| 2,402,960 | Gustafson et al. | July 2, 1946 |
| 2,403,177 | Gustafson | July 2, 1946 |
| 2,413,844 | Rawlings | Jan. 7, 1947 |

FOREIGN PATENTS

| Number | Country | Date |
|---|---|---|
| 116,691 | Australia | Mar. 9, 1943 |

OTHER REFERENCES

Geerlings; "Cane Sugar and its Manufacturing," 2nd Ex. (1924) pages 149 and 174.

Ser. No. 359,575, Smit (A. P. C.), published May 11, 1943.